United States Patent
Berman et al.

(10) Patent No.: US 9,487,103 B2
(45) Date of Patent: Nov. 8, 2016

(54) AUXILIARY BATTERY MANAGEMENT SYSTEM AND METHOD

(71) Applicant: GM GLOBAL TECHNOLOGY OPERATIONS LLC, Detroit, MI (US)

(72) Inventors: Cody D. Berman, Ann Arbor, MI (US); Vivekananda Shripathy, Farmington Hills, MI (US); Thomas John Timpf, Jr., Royal Oak, MI (US); Godwin Wede, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 14/468,880

(22) Filed: Aug. 26, 2014

(65) Prior Publication Data

US 2016/0059726 A1  Mar. 3, 2016

(51) Int. Cl.
| | |
|---|---|
| *B60L 11/18* | (2006.01) |
| *B60L 3/00* | (2006.01) |
| *H01M 10/44* | (2006.01) |
| *B60W 10/26* | (2006.01) |
| *B60L 3/12* | (2006.01) |
| *B60R 16/033* | (2006.01) |
| *H02J 7/00* | (2006.01) |

(52) U.S. Cl.
CPC .......... *B60L 11/1861* (2013.01); *B60L 3/0046* (2013.01); *B60L 3/12* (2013.01); *B60L 11/1851* (2013.01); *B60L 11/1868* (2013.01); *B60R 16/033* (2013.01); *B60W 10/26* (2013.01); *H01M 10/44* (2013.01); *B60L 3/0023* (2013.01); *B60L 11/1859* (2013.01); *B60L 2240/547* (2013.01); *H02J 7/00* (2013.01); *Y10S 903/907* (2013.01)

(58) Field of Classification Search
CPC ............ B60L 11/1861; B60L 11/1868; B60L 11/1809; B60L 11/1851; B60L 3/0046; B60L 3/12; B60R 16/033
See application file for complete search history.

(56) References Cited

U.S. PATENT DOCUMENTS

| | | | |
|---|---|---|---|
| 5,698,967 A * | 12/1997 | Baer | B60L 11/1861 320/119 |
| 5,739,670 A * | 4/1998 | Brost | H01M 10/48 320/112 |
| 6,211,681 B1 * | 4/2001 | Kagawa | B60L 11/123 320/104 |
| 6,424,157 B1 * | 7/2002 | Gollomp | B60L 11/1861 320/132 |
| 6,710,575 B2 * | 3/2004 | Youn | B60L 11/1861 320/104 |
| 6,982,499 B1 * | 1/2006 | Kachi | B60L 11/1851 320/104 |
| 2002/0084768 A1 * | 7/2002 | Youn | B60L 11/1861 320/104 |
| 2003/0146726 A1 * | 8/2003 | Ishikawa | B60L 11/123 318/442 |
| 2008/0053716 A1 * | 3/2008 | Scheucher | B60L 11/1861 320/109 |

(Continued)

Primary Examiner — Dale W Hilgendorf
(74) Attorney, Agent, or Firm — Quinn Law Group (57) ABSTRACT

A battery management method includes the following steps: (a) reading, via a battery management processor, a non-volatile memory to determine if the non-volatile memory contains data indicative of a brownout in the auxiliary battery module; (b) receiving, via the battery management processor, at least one input signal from at least one brown-out detector of at least one smart device having a device processor in order to determine a brownout condition in at least one smart device; (c) determining, via the battery management processor, that a triggering event has occurred if the non-volatile memory contains data indicative of the brownout in the auxiliary battery module or the at least one smart device exhibits a brownout condition; and (d) commanding, via the battery management processor, the main battery module to electrically charge the auxiliary battery module of the hybrid vehicle if the triggering event has occurred.

19 Claims, 2 Drawing Sheets

(56) References Cited

U.S. PATENT DOCUMENTS

| | | | | |
|---|---|---|---|---|
| 2010/0001523 A1* | 1/2010 | Sato | B60L 11/1868 | 290/31 |
| 2010/0023207 A1* | 1/2010 | Maeda | G07C 5/085 | 701/33.4 |
| 2010/0244782 A1* | 9/2010 | Nagayama | B60L 11/1868 | 320/162 |
| 2012/0256568 A1* | 10/2012 | Lee | B60L 11/1866 | 318/139 |
| 2013/0014499 A1* | 1/2013 | Gray, Jr. | B60K 6/12 | 60/327 |
| 2013/0187590 A1* | 7/2013 | Ferrel | B60L 1/00 | 320/104 |
| 2014/0039705 A1* | 2/2014 | Magini | G05F 1/66 | 700/287 |
| 2014/0070759 A1* | 3/2014 | Iwai | B60L 11/1868 | 320/104 |
| 2014/0239870 A1* | 8/2014 | Nawa | B60L 3/0046 | 318/503 |
| 2014/0265560 A1* | 9/2014 | Leehey | B60L 11/1868 | 307/10.1 |
| 2014/0358367 A1* | 12/2014 | Copeland | B60R 16/03 | 701/36 |
| 2015/0056478 A1* | 2/2015 | Yamamoto | G01R 31/3679 | 429/50 |

* cited by examiner

AUXILIARY BATTERY MANAGEMENT SYSTEM AND METHOD

TECHNICAL FIELD

The present disclosure relates to an auxiliary battery management system and method.

BACKGROUND

Hybrid electric vehicles typically include an internal combustion engine and at least one electric machine, such as an electric motor-generator, for propulsion. These hybrid electric vehicles employ two batteries; one is used to start the internal combustion engine and to power vehicle accessories and the other battery may be used to propel the vehicle.

SUMMARY

It is useful to prevent a cranking event interruption in a hybrid electric vehicle. A cranking event interruption occurs when an internal combustion engine fails to start even though an auxiliary battery module is electrically connected to a starter that is coupled to the internal combustion engine. Such cranking event interruption may occur because the auxiliary battery module may be discharged. The presently disclosed battery management method and system can be employed to minimize the possibility of a cranking event interruption. In doing so, the presently disclosed method and system can manage the operation of the auxiliary battery module and the main battery module of a hybrid vehicle. In an embodiment, the method includes the following steps: (a) reading, via a battery management processor, a non-volatile memory to determine if the non-volatile memory contains data indicative of a brownout in the auxiliary battery module; (b) receiving, via the battery management processor, at least one input signal from at least one brownout detector of at least one smart device having a device processor in order to determine a brownout condition in the smart device; (c) determining, via the battery management processor, that a triggering event has occurred if the non-volatile memory contains data indicative of a brownout in the auxiliary battery module or the smart device exhibits a brownout condition; and (d) commanding, via the battery management processor, the main battery module to electrically charge the auxiliary battery module of the hybrid vehicle if the triggering event has occurred. The present disclosure also relates to a battery management system including a battery management processor specifically programmed to execute the method described above.

The above features and advantages and other features and advantages of the present teachings are readily apparent from the following detailed description of the best modes for carrying out the teachings when taken in connection with the accompanying drawings.

DETAILED DESCRIPTION

Figure 1:
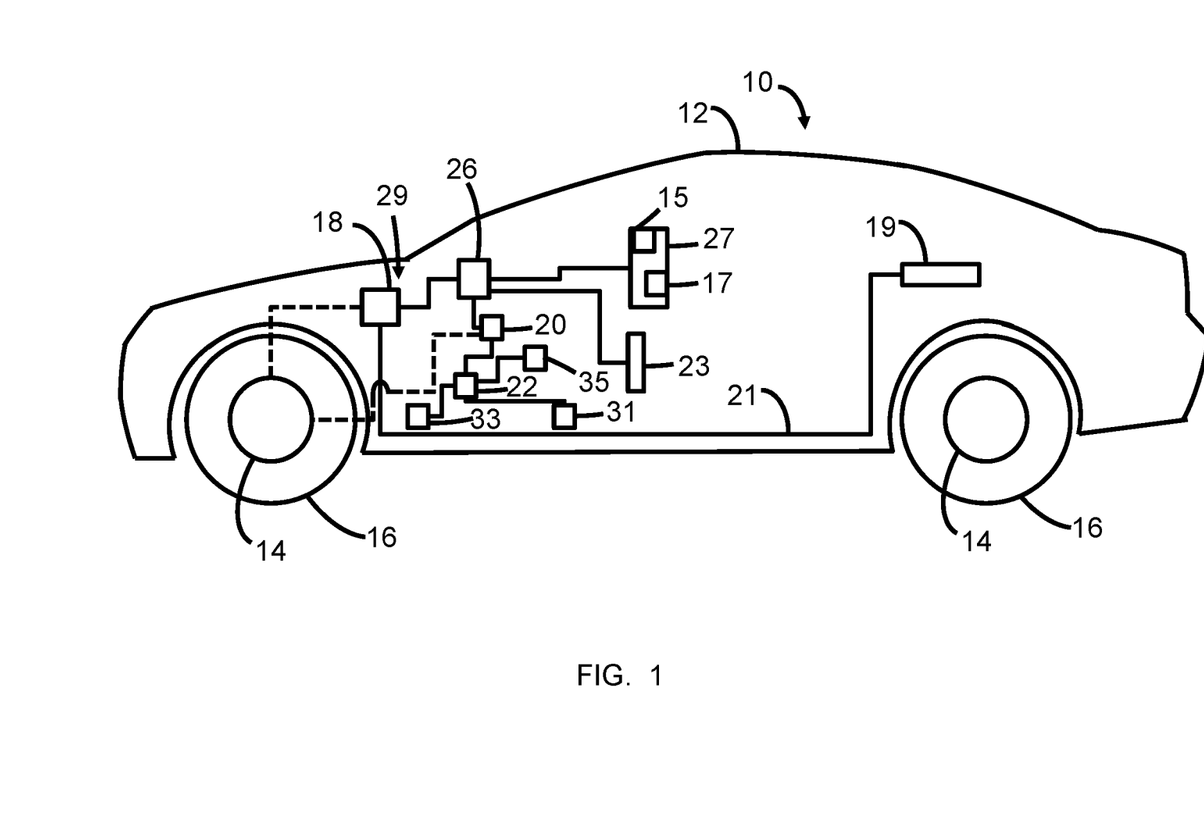
FIG. 1 is a schematic diagram of a hybrid vehicle.

Referring to the drawings in which like elements are identified with identical numerals throughout, FIG. 1 schematically illustrates a hybrid vehicle 10, such as a plug-in hybrid electric vehicle (PHEV) or an extended-range electric vehicle (EREV). In the depicted embodiment, the hybrid vehicle 10 includes a vehicle body 12 and a plurality of wheels 14 operatively coupled to the vehicle body 12. Each wheel 14 is coupled to a tire 16. The hybrid vehicle 10 further includes a hybrid powertrain 29. The hybrid powertrain 29 includes an internal combustion engine 18 operatively coupled to at least one of the wheels 14. The hybrid vehicle 10 further includes a fuel source 19, such as a fuel tank, in fluid communication with the internal combustion engine 18. A conduit 21 fluidly couples the fuel source 19 to the internal combustion engine 18. The internal combustion engine 18 is, therefore, fluidly coupled to the fuel source 19. The fuel source 19 contains a fuel, such as gasoline, and can therefore supply fuel to the internal combustion engine 18 via the conduit 21. In operation, the internal combustion engine 18 can combust the fuel supplied by the fuel source 19 in order to generate torque. The torque generated by the internal combustion engine 18 can be transmitted to the wheels 14 in order to propel the hybrid vehicle 10.

The hybrid powertrain 29 additionally includes at least one electric machine 20 and a main battery module 22 electrically connected to the electric machine 20. The main battery module 22 may be a single battery, battery pack, fuel cell, or a combination thereof and can supply electrical energy to the electric machine 20. The main battery module 22 may be referred to as the high voltage battery. Aside from being electrically connected to the main battery module 22, the electric machine 20 is operatively coupled to the internal combustion engine 18 and can therefore receive mechanical energy (e.g., torque) from the internal combustion engine 18. The electric machine 20 is also operatively coupled to at least one of the wheels 14 and can therefore be used to drive the wheels 14.

The electric machine 20 can operate in motoring mode and generating mode. In the motoring mode, the electric machine 20 can convert the electrical energy received from the main battery module 22 into mechanical energy (e.g., torque). When operating in the motoring mode, the electric machine 20 can transmit mechanical energy (e.g., torque) to the wheels 14 in order to propel the hybrid vehicle 10. In the generating mode, the electric machine 20 can receive mechanical energy (e.g., torque) from the internal combustion engine 18 and can convert the mechanical energy into electrical energy. The electrical energy generated by the electric machine 20 can then be transmitted to the main battery module 22.

The hybrid powertrain 29 and hybrid vehicle 10 can operate in a charge-depletion mode. In the charge-depletion mode, the hybrid vehicle 10 only uses the electrical energy from the main battery module 22. In other words, in the charge-depletion mode, the hybrid powertrain 29 may only use energy from the main battery module 22 to propel the hybrid vehicle 10. Accordingly, the electrical energy stored in the main battery module 22 is depleted when the hybrid vehicle 10 is operated in the charge-depletion mode. In other words, the hybrid vehicle 10 only uses the electrical energy stored in the main battery module 22 when operating in the charge-depletion mode. In one example, in the charge-depletion mode, the hybrid powertrain 29 only uses power from the electric machine 20 to propel the hybrid vehicle 10. In another example, when the hybrid powertrain 29 operates in the charge-depletion mode, most of the power used to propel the hybrid vehicle 10 originates from the electric machine 20.

The hybrid powertrain 29 and hybrid vehicle 10 can also operate in a charge-sustaining mode. In the charge-sustaining mode, the hybrid vehicle 10 only uses the energy from the fuel source 19 and, therefore, the electrical energy stored in the main battery module 22 is not depleted. As a consequence, the state of charge (SOC) of the main battery module 22 is maintained while the hybrid vehicle 10 operates in the charge-sustaining mode. In one example, in the charge-sustaining mode, the hybrid powertrain 29 only uses power from the internal combustion engine 18 to propel the hybrid vehicle 10. In another example, when the hybrid powertrain 29 operates in the charge-sustaining mode, most of the power used to propel the hybrid vehicle 10 originates from the internal combustion engine 18.

The hybrid powertrain 29 and hybrid vehicle 10 can also operate in a blended mode. In the blended mode, the hybrid powertrain 29 uses power from the internal combustion engine 18 and the electric machine 20 to propel the hybrid vehicle 10. In other words, the hybrid powertrain 29 uses energy from the main battery module 22 and the fuel source 19 to power the hybrid vehicle 10.

Figure 2:
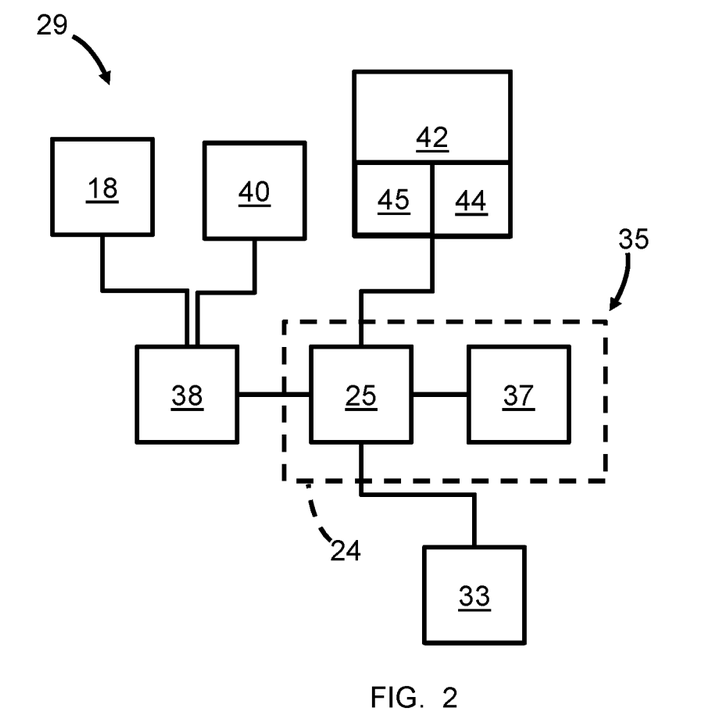
FIG. 2 is a schematic diagram of a part of the hybrid powertrain of the hybrid vehicle shown in FIG. 1.

The hybrid vehicle 10 also includes an auxiliary battery module 33, such as a single 12-volt battery, that stores power for one or more vehicle accessories 40 (FIG. 2). As non-limiting examples, the vehicle accessories 40 include headlights, windshield wipers, power door locks, power seats, power steering pump, a water pump, or an air conditioning compressor, an audio system, and other vehicle accessories or devices. The auxiliary battery module 33 may be referred to as the low voltage battery and can be recharged by the main battery module 22 via an auxiliary power module (not shown), which may be electrically connected to the auxiliary battery module 33. The auxiliary power module is a DC-DC power converter that converts power from the high voltage of the main battery module 22 to the low voltage required by the auxiliary battery module 33.

The hybrid vehicle 10 further includes a control module 26 in electronic communication with the electric machine 20 and internal combustion engine 18. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module 26 includes at least one processor and at least one associated memory. As a non-limiting example, the control module 26 can be a powertrain control module that regulates operation of one or more components of the hybrid powertrain 29. According to one embodiment, the control module 26 is equipped with on-board diagnostic (OBD) features that provide real-time data, such as that received from various sensors including vehicle emissions sensors, and provide a standardized series of diagnostic trouble codes (DTCs) that allow a technician to identify vehicle operations occurrences. In one embodiment, the control module 26 is an engine control module that regulates the operation of the internal combustion engine 18.

The internal combustion engine 18, electric machine 20, control module 26, auxiliary battery module 33, and main battery module 22 may be part of the hybrid powertrain 29. The hybrid powertrain 29 is configured to propel the hybrid vehicle 10. The hybrid powertrain 29 can also operate in a charge-sustaining mode and a charge-depletion mode as discussed above with respect to the hybrid vehicle 10. The control module 26 is not necessarily part of the hybrid powertrain 29.

The hybrid powertrain 29 also includes a torque request actuator 23, such as an accelerator pedal, operatively coupled to the control module 26. As such, actuation of the torque request actuator 23 causes the control module 26 to command the hybrid powertrain 29 to generate additional output torque and transmit that additional output torque to the wheels 14. As a non-limiting example, the torque request actuator 23 may be an accelerator pedal that can be depressed to request additional output torque from the hybrid powertrain 29.

The hybrid vehicle 10 may further include a state of charge (SOC) sensor 31 operatively coupled to the main battery module 22. The SOC sensor 31 is in electronic communication with the control module 26 and can determine the current SOC of the main battery module 22. In operation, the SOC sensor 31 can generate a signal indicative of the current SOC of the main battery module 22. Further, the SOC sensor 31 can send the generated signal to the control module 26.

The hybrid vehicle 10 includes at least one vehicle user interface 27 in communication (e.g., electronic communication) with the control module 26. As used herein, the term "vehicle user interface" includes any suitable form of electronic device, including both hardware and software components, which is located on the vehicle and enables a vehicle user to communicate with or through a component of the hybrid vehicle 10. The vehicle user interface 27 is capable of receiving an input from a user. In response to the input from the user, the vehicle user interface 27 generates an input signal representative of the user's input. Moreover, the vehicle user interface 27 can send the input signal to the control module 26. For example, the vehicle user interface 27 may be a touch-screen or at least one button that the user (e.g., driver or passenger) can press in order to send an input signal to the control module 26.

The hybrid vehicle 10 further includes a battery management system (BMS) 35 in communication with the main battery module 22 and the auxiliary battery module 33. In operation, the BMS 35 can control the operation of the main battery module 22 and the auxiliary battery module 33.

With reference to FIG. 2, the BMS 35 includes at least one battery management controller 24, such as a microcontroller. The battery management controller 24 is specifically programmed to execute the steps of the methods described below and communicates (e.g., electronic communication) with the auxiliary battery module 33 and the main battery module 22. Accordingly, the battery management controller 24 can regulate the operation of the auxiliary battery module 33. In the depicted embodiment, the battery management controller 24 includes a battery management processor 25, such as a microprocessor, and a non-volatile memory 37 in communication with the battery management processor 25. The non-volatile memory 37 can store computer-readable instructions (i.e., software) and is a non-transitory storage medium. In one embodiment, the non-volatile memory 37 is a random-access memory (RAM). The battery management processor 25 can read the non-volatile memory 37 and can execute the computer-readable instructions stored in the non-volatile memory 37. Moreover, the battery management processor 25 is in communication with smart devices 42. In the present disclosure, the term "smart device" refers to a vehicle device that includes a device processor 45 capable of executing computer-readable instructions (i.e., software). Each smart device 42 includes a brownout detector 44 configured to detect a drop in voltage. The brownout detector 44 may be a brownout detector circuit capable of comparing the supply voltage to a predetermined fixed threshold. The battery management processor 25 is in communication with the brownout detector 44 and can determine brownout conditions in the smart devices 42 based on inputs from the brownout detector 44. Each smart device 42 is electrically connected to the auxiliary battery module 33 and is therefore configured to receive electrical energy from the auxiliary battery module 33. The smart device 42 may be connected to the auxiliary battery module 33 via a wired connection or a wireless connection.

The hybrid powertrain 29 further includes a starter 38 configured to receive electrical energy from the auxiliary battery module 33. In the depicted embodiment, the starter 38 is a belt alternator-starter (BAS), which combines a starter and alternator motor/generator and includes a belt (not shown) for driving vehicle accessories 40 and for cranking the internal combustion engine 18. Accordingly, the starter 38 is operatively coupled to the auxiliary battery module 33 and the internal combustion engine 18. Specifically, the starter 38 can convert electrical energy from the auxiliary battery module 33 into mechanical energy in order to rotate the crankshaft (not shown) of the internal combustion engine 18, causing the internal combustion engine 18 to start running.

With reference again to FIG. 1, the vehicle user interface 27 includes a jumpstart input device 17, such as a virtual or physical button, configured to receive an input from the user. The user may, for example, press or slide the jumpstart input device 17 to send a jumpstart command to the battery management controller 24. Upon receipt of the jumpstart command, battery management controller 24 commands the main battery module 22 to electrically charge the auxiliary battery module 33. This can be performed by electrically connecting the main battery module 22 to the auxiliary battery module 33. The user can, for example, press the jumpstart input device 17 to send an input signal to the battery management controller 24. In response, the battery management controller 24 commands the BMS 35 to electrically connect the auxiliary battery module 33 to the main battery module 22 in order to electrically charge the auxiliary battery module 33 with electrical energy from the main battery module 22. Once the auxiliary battery module 33 is electrically charged, the user can turn the vehicle ignition switch 15 to start the internal combustion engine 18. The ignition switch 15 is configured to initiate a cranking event by electrically connecting the starter 38 to the auxiliary battery module 33 in response to an operator key-on command or in response to an autostart command. It is appreciated that the engine speed is 0 revolutions per minute (RPM), i.e., the engine is in a stopped state and is not rotating prior to initiating the cranking event. A key-on engine starting event is executed in response to an operator key-on command to the ignition switch 15, for example when an operator first enters a vehicle to begin a trip. It is appreciated that a key-on engine starting event includes a remote-start event and other similar operations. An autostart engine starting event is executed in response to a command from the control module 26 to activate the ignition switch 15, for example subsequent to an autostop command during ongoing vehicle operation. Alternatively, the starter 38 automatically starts the internal combustion engine 18 after the auxiliary battery module 33 is electrically charged by the main battery module 22.

A battery management method for controlling the hybrid vehicle 10 is described below. Specifically, the method can be executed by the battery management processor 25 in order to jumpstart the hybrid vehicle 10 upon detection of a cranking event interruption. In the present disclosure, the term "jumpstart" means electrically charging the auxiliary battery module 33 with electrical energy from the main battery module 22. Thus, during a jumpstart, the main battery module 22 supplies electrical energy to the auxiliary battery module 33. After the hybrid vehicle 10 performs a jumpstart, a cranking event is initiated by electrically connecting the starter 38 to the auxiliary battery module 33 in response to an operator key-on command or in response to an autostart command from the control module 26. The term "cranking event" means the transfer of mechanical power from the starter 38 to the crankshaft (not shown) of the internal combustion engine 18 in order to start the internal combustion engine 18. A cranking event is initiated when the auxiliary battery module 33 is electrically connected to the starter 38. A "cranking event interruption" occurs when the internal combustion engine 18 does not start running even after the auxiliary battery module 33 is electrically connected to the starter 38. Such cranking event interruption may occur because the auxiliary battery module 33 is discharged. Among other things, the method 440 can be employed to automatically commence a jumpstart after identifying a cranking event interruption.

The method is used during initialization of the BMS 35 and begins by powering up the battery management processor 25. As discussed above, the battery management processor 25 may be a microprocessor. The battery management processor 25 can power up in response to a command from the control module 26. To power up, the battery management processor 25 receives electrical energy from the auxiliary battery module 33.

After powering up the battery management processor 25 it is determined whether the battery management processor 25 has experienced a loss of power before powering up the battery management processor 25. As discussed above, the battery management processor 25 can receive electrical power from the auxiliary battery module 33. Before powering up, the battery management processor 25 can operate in sleep mode or it can be completely turned off. In the sleep state (or any other low-power mode), the battery management processor 25 operates at a reduced operational power. That is, the operational power of the battery management processor 25 in the sleep state is less than the operational power in a fully operational state. When the battery management processor 25 powers up, it can identify whether it was operating in a sleep mode or it was completely turned off due to a loss of electrical power. The battery management processor 25 determines whether it had experienced a loss of electrical power before powering up.

If the battery management processor 25 determines that it did not experience a loss of electrical power before powering up, then the battery management processor 25 continues with its normal wakeup process.

If the battery management processor 25 determines that it did experience a loss of electrical power before powering up, then the battery management processor 25 reads the non-volatile memory 37 in order to determine whether its stored data is intact (i.e., not corrupted). If the battery management processor 25 determines that the data stored in the non-volatile memory 37 is not intact (i.e., is corrupted), then the battery management processor 25 continues with its normal wakeup process.

If the battery management processor 25 determines that the data stored in the non-volatile memory 37 is intact (i.e., not corrupted), then the battery management processor 25 reads the non-volatile memory 37 in order to identify data indicative of a brownout in the auxiliary battery module 33 (i.e., brownout data) before powering up the battery management processor 25. As discussed above, a "brownout" is a drop in voltage. The brownout data may be stored in different ways in the non-volatile memory 37. For example, as discussed in detail below, the battery management processor 25 can write data patterns in the non-volatile memory 37 that are indicative of different brownout conditions. These data patterns can be written in specific brownout variable addresses that help identify the particular brownout condition. Thus, the battery management processor 25 can read the non-volatile memory 37 in order to determine if a data pattern is present in the brownout variable address of the non-volatile memory 37. Alternatively, the battery management processor 25 can use flags indicative of brownout conditions that occurred before powering up the battery management processor 25.

If the battery management processor 25 determines that the data stored in the non-volatile memory 37 is intact (i.e., not corrupted), then the battery management processor 25 receives an input signal from at least one of the brownout detectors 44 of the smart devices 42 in order to detect a brownout condition in at least one of the smart devices 42. As discussed above, the smart devices 42 include a brownout detector 44 and a device processor 45 capable of executing computer-readable instructions. The battery management processor 25 determines the brownout conditions in the smart devices 42 based on the input signals from the brownout detectors 44.

If no brownout conditions are detected in the smart devices 42 and no brownout data is identified in the non-volatile memory 37, then the battery management processor 25 continues with its normal wakeup process.

If either a brownout condition is detected in the smart devices 42 or brownout data is identified in the non-volatile memory 37, then the battery management processor 25 determines that at least one triggering event is occurring or has occurred. In the present disclosure, "triggering events" are events in the hybrid vehicle 10 that utilize enough electrical energy from the auxiliary battery module 33 and (individually or collectively) cause a cranking event interruption. As discussed above, a cranking event interruption can occur when the auxiliary battery module 33 does not provide the starter 38 enough electrical power to start the internal combustion engine 18. The triggering events may also be referred to as high voltage events. As non-limiting examples, triggering events or indications include unfiltered battery voltage transients in the auxiliary battery module 33, usage of high current devices, such as relays and electrical connectors, and a crank request followed by a cranking event interruption. In the present disclosure, a "crank request" refers to a request to initiate a cranking event. The term "high current devices" refers to devices that require an electrical current greater than a predetermined current threshold in order to function as intended. After detecting a triggering event, the battery management processor 25 increments a brownout counter by 1.

Then, the battery management processor 25 compares the brownout counter with a predetermined brownout threshold to determine whether the value in the brownout counter is greater than the predetermined brownout threshold. If the value in the brownout counter is greater than the predetermined brownout threshold, then the control module 26 activates a diagnostic trouble code (DTC) in order to allow a technician to identify the brownout state of the auxiliary battery module 33. In other words, the control module 26 activates a diagnostic code. After the control module 26 activates a DTC, the battery management processor 25 continues with its normal wakeup process. If the value in the brownout counter is less than the predetermined brownout threshold, the control module 26 does not activate a DTC, and the battery management processor 25 continues with its normal wakeup process.

Next, the battery management processor 25 commands the BMS 35 to perform a jumpstart. As discussed above, the term "jumpstart" means electrically charging the auxiliary battery module 33 with electrical energy from the main battery module 22. To perform the jumpstart, the main battery module 22 is electrically connected to the auxiliary battery module 33. Alternatively or additionally, the battery management processor 25 commanding the BMS 35 to perform a jumpstart may include sending a message to the vehicle user, via the vehicle user interface 27, that a jumpstart should be conducted. The user can then manually initiate a jumpstart by activating the jumpstart input device 17. As discussed above, the hybrid powertrain 29 electrically charges the auxiliary battery module 33 with electrical energy from the main battery module 22 upon activation of the jumpstart input device 17. After performing a jumpstart, a cranking event can be initiated in response to an operator key-on command or in response to an autostart command.

The battery management processor 25 can also periodically run a method for identifying and recording the triggering events used in the previously described method to jumpstart the hybrid vehicle 10. The method identifying and recording the triggering events begins with the battery management processor 25 determining if it has received a crank request from the ignition switch 15 or a control module, such as the control module 26. As discussed above, a "crank request" refers to a request to initiate a cranking event. During a cranking event, the auxiliary battery module 33 supplies electrical power to the starter 38 and, in response, the starter 38 applies torque to the crankshaft (not shown) in order to the start the internal combustion engine 18. At this point, the battery management processor 25 also determines if the internal combustion engine 18 began running after the crank request. In other words, the battery management processor 25 detects a cranking event interruption based, for example, on inputs from the control module 26. As discussed above, a "cranking event interruption" occurs when the internal combustion engine 18 does not start running even after the auxiliary battery module 33 is electrically connected to the starter 38.

If a crank request has been received and a cranking event interruption is detected, then the battery management processor 25 writes data indicative of such crank request and cranking event interruption in the non-volatile memory 37. For example, the battery management processor 25 can write a first data pattern (i.e., pattern A) in the non-volatile memory 37. The first data pattern can be indicative that a crank request has been received by the battery management processor 25 and cranking event interruption occurred after the crank request. Therefore, when the battery management processor 25 reads the first data pattern during initialization in the previously described method for controlling the hybrid vehicle 10, it can detect that at least one triggering event (which in this case is the crank request followed by the cranking event interruption) has occurred. After writing the first data pattern in the non-volatile memory 37, the battery management processor 25 determines if there are unfiltered battery voltage transients in the auxiliary battery module 33. If no crank request has been received and no cranking event interruption has been detected, then the battery management processor 25 proceeds directly to determining if there are unfiltered battery voltage transients in the auxiliary battery module 33.

After writing the first data pattern in the non-volatile memory 37, the battery management processor 25 determines if there are unfiltered battery voltage transients in the auxiliary battery module 33. The battery management processor 25 is electrically connected to the auxiliary battery module 33 and can therefore monitor the voltage of the auxiliary battery module 33 in order to detect unfiltered battery voltage transients. The unfiltered battery voltage transient can be detected, for example, if the absolute voltage of the auxiliary battery module 33 is outside a predetermined voltage range, the average voltage is outside of a predetermined voltage range, or both.

If the battery management processor 25 detects unfiltered battery voltage transients in the auxiliary battery module 33, the battery management processor 25 writes data indicative of the unfiltered battery voltage transients in the non-volatile memory 37. For example, the battery management processor 25 can write a second data pattern (i.e., pattern B) in the non-volatile memory 37. The second data pattern can be indicative that the battery management processor 25 has detected unfiltered battery voltage transients in the auxiliary battery module 33. Therefore, when the battery management processor 25 reads the second data pattern during initialization in the previously described method for controlling the hybrid vehicle 10, it can detect that at least one triggering event, which in this case is the unfiltered battery voltage transients, has occurred. After writing the second data pattern in the non-volatile memory 37, the battery management processor 25 determines if high current devices, such as relays and electrical connectors, have been requested to be driven by the auxiliary battery module 33 (i.e., the "device driving request"). If no unfiltered battery voltage transient has been detected, then the battery management processor 25 proceeds directly to determining if high current devices, such as relays and electrical connectors, have been requested to be driven by the auxiliary battery module 33 (i.e., the "device driving request").

After writing the second data pattern in the non-volatile memory 37, the battery management processor 25 determines if high current devices, such as relays and electrical connectors, have been requested to be driven by the auxiliary battery module 33 (i.e., the "device driving request"). The term "high current devices" refers to devices that require an electrical current that is greater than a predetermined current threshold in order to function as intended. Some of the vehicle accessories 40 (FIG. 2) may be high current devices. Because the battery management processor 25 is in communication with the control module 26 and the auxiliary battery module 33, the battery management processor 25 can receive inputs from the control module 26, and/or the auxiliary battery module 33 in order to determine if a device driving request has been received. Accordingly, the battery management processor 25 can determine if high current devices have been requested to be driven with electrical energy from the auxiliary battery module 33 based on inputs from the control module 26, and/or the auxiliary battery module 33.

If at least one high current device has been requested to be driven with electrical energy from the auxiliary battery module 33, then the battery management processor 25 writes data indicative of the device driving request in the non-volatile memory 37. For example, the battery management processor 25 can write a third data pattern (i.e., pattern C) in the non-volatile memory 37. The third data pattern can be indicative that the battery management processor 25 has determined that at least one high current device has been requested to be driven by the starter 38 with electrical energy from the auxiliary battery module 33. Therefore, when the battery management processor 25 reads the third data pattern during initialization in the previously described method for controlling the hybrid vehicle 10, it can detect that at least one triggering event, which in this case is the device driving request, has occurred. After writing the third data pattern in the non-volatile memory 37, the battery management processor 25 determines if a jumpstart has been requested (i.e., jumpstart request). If no device driving request has been detected, then the battery management processor 25 proceeds directly to determining if a jumpstart has been requested (i.e., jumpstart request).

As discussed above, the battery management processor 25 determines if a jumpstart has been requested (i.e., jumpstart request). A jumpstart request can be initiated by the user or by the BMS 35 in accordance with the previously described method for controlling the hybrid vehicle 10. As discussed above, the term "jumpstart" means electrically charging the auxiliary battery module 33 with electrical energy from the main battery module 22. Because the battery management processor 25 is in communication with the auxiliary battery module 33, the battery management processor 25 can determine whether the auxiliary battery module 33 was electrically charged by the main battery module 22. Specifically, the battery management processor 25 can determine that a jumpstart has occurred or has been initiated.

If a jumpstart has occurred (or initiated), then the battery management processor 25 writes data indicative of a jumpstart request. For example, the battery management processor 25 can write a fourth data pattern (i.e., pattern D) in the non-volatile memory 37. The fourth data pattern can be indicative that the battery management processor 25 has determined that a jumpstart has been requested. Therefore, when the battery management processor 25 reads the fourth data pattern during initialization in the previously described method for controlling the hybrid vehicle 10, it can detect that at least one triggering event, which in this case is the jumpstart request, has occurred. After writing the fourth data pattern in the non-volatile memory 37, the method 2Q for identifying and recording the triggering events ends. If the fourth data pattern was written and another jumpstart was requested (either by the user or the BMS 35), the amount of time that the hybrid vehicle 10 would charge the auxiliary battery module 33 increases. The longer charge time would make it more likely for the auxiliary battery module 33 to have enough energy to start the internal combustion engine 18. If no jumpstart request has been detected, then the battery management processor 25 proceeds directly to ending the method for identifying and recording the triggering events.

After either the battery management processor 25 determines if a jumpstart has been requested (i.e., jumpstart request) or the battery management processor 25 writes data indicative of a jumpstart request, the method for identifying and recording the triggering events ends.

While the best modes for carrying out the teachings have been described in detail, those familiar with the art to which this disclosure relates will recognize various alternative designs and embodiments for practicing the teachings within the scope of the appended claims.

The invention claimed is:

1. A battery management method for managing an auxiliary battery module and a main battery module of a hybrid vehicle, the method comprising:
   determining that a battery management controller has experienced a loss of electrical power such that a battery management processor of the battery management controller was completely turned off due to the loss of electrical power, wherein the battery management controller further includes a non-volatile memory;
   determining whether the non-volatile memory is intact after the loss of electrical power;
   reading, via the battery management processor, the non-volatile memory to determine if the non-volatile memory contains data indicative of a brownout in the auxiliary battery module;
   receiving, via the battery management processor, at least one input signal from at least one brownout detector of at least one smart device having a device processor in order to determine a brownout condition in the at least one smart device, wherein the at least one smart device is configured to receive electrical energy from the auxiliary battery module;
   determining, via the battery management processor, that a triggering event has occurred if the non-volatile memory contains data indicative of the brownout in the auxiliary battery module or the at least one smart device exhibits the brownout condition; and
   commanding, via the battery management processor, the main battery module to electrically charge the auxiliary battery module of the hybrid vehicle if the triggering event has occurred.

2. The battery management method of claim 1, wherein the method further includes powering up the battery management controller.

3. The battery management method of claim 1, wherein determining, via the battery management processor, whether the battery management controller has experienced the loss of electrical power occurs after powering up the battery management controller.

4. The battery management method of claim 2, wherein the battery management processor reads the non-volatile memory to determine if the non-volatile memory contains data indicative of the brownout in the auxiliary battery module if the non-volatile memory is intact after the loss of electrical power.

5. The battery management method of claim 4, wherein the battery management processor receives the at least one input signal from the at least one brownout detector if the non-volatile memory is intact after the loss of electrical power.

6. The battery management method of claim 1, further comprising incrementing, via the battery management processor, a brownout counter after the battery management processor determines that the triggering event has occurred.

7. The battery management method of claim 6, further comprising determining, via the battery management processor, whether a value of the brownout counter is greater than a predetermined brownout threshold.

8. The battery management method of claim 7, activating, via the battery management processor, a diagnostic code if the value of the brownout counter is greater than the predetermined brownout threshold.

9. The battery management method of claim 1, further comprising determining, via the battery management processor, whether a crank request has been received.

10. The battery management method of claim 9, further comprising writing, via the battery management processor, data indicative of the crank request in the non-volatile memory if the crank request was received, wherein the data indicative of the crank request is part of the data indicative of the brownout in the auxiliary battery module.

11. The battery management method of claim 10, further comprising detecting a cranking event interruption after the crank request has been received, and the data indicative of the crank request is also indicative of the cranking event interruption.

12. The battery management method of claim 1, further comprising detecting unfiltered battery voltage transients in the auxiliary battery module.

13. The battery management method of claim 12, further comprising writing, via the battery management processor, data indicative of the unfiltered battery voltage transients in the non-volatile memory if unfiltered battery voltage transients were detected, wherein the data indicative of the unfiltered battery voltage transients is part of the data indicative of the brownout in the auxiliary battery module.

14. The battery management method of claim 1, further comprising determining, via the battery management processor, if at least one high current device has been requested to be driven with electrical power from the auxiliary battery module.

15. The battery management method of claim 14, further comprising writing, via the battery management processor, data indicative that at least one high current device has been requested to be driven in the non-volatile memory if at least one high current device has been requested to be driven, wherein the data indicative that at least one high current device has been requested to be driven is part of the data indicative of the brownout in the auxiliary battery module.

16. The battery management method of claim 1, further comprising determining, via the battery management processor, if the main battery module electrically charged the auxiliary battery module.

17. The battery management method of claim 16, further comprising writing, via the battery management processor, data indicative that the main battery module electrically charged the auxiliary battery module in the non-volatile memory if the main battery module electrically charged the auxiliary battery module, wherein the data indicative that the main battery module electrically charged the auxiliary battery module is part of the data indicative of the brownout in the auxiliary battery module.

18. The battery management method of claim 17, further comprising increasing an amount of time that the main battery module electrically charges the auxiliary battery module if the non-volatile memory previously contains data indicative that the main battery module electrically charged the auxiliary battery module.

19. A battery management system for a hybrid vehicle having an auxiliary battery module and a main battery module, the battery management system comprising:
   a non-volatile memory;
   a battery management processor in communication with the non-volatile memory, wherein the battery management processor is programmed to:
      determine that the battery management processor experienced a loss of electrical power such that the battery management processor was completely turned off due to the loss of electrical power;

determine whether the non-volatile memory is intact after the loss of electrical power;

read the non-volatile memory to determine if the non-volatile memory contains data indicative of a brownout in the auxiliary battery module of the hybrid vehicle;

receive input signals from at least one brownout detector of at least one smart device having a device processor in order to determine a brownout condition in the at least one smart device, wherein the at least one smart device is configured to receive electrical energy from the auxiliary battery module;

determine that a triggering event has occurred if the non-volatile memory contains data indicative of the brownout in the auxiliary battery module or the at least one smart device exhibits the brownout condition; and command the main battery module to electrically charge the auxiliary battery module of the hybrid vehicle if the triggering event has occurred.

* * * * *